United States Patent [19]
Russell

[11] Patent Number: 5,482,096
[45] Date of Patent: Jan. 9, 1996

[54] TRANSPOSING INCLINED MORTISE TEMPLATE ASSEMBLY

[76] Inventor: Thomas G. Russell, 1368 Cedar La., Middletown, Del. 19709-9312

[21] Appl. No.: 276,796

[22] Filed: Jul. 18, 1994

[51] Int. Cl.[6] .................................................. B27C 5/10
[52] U.S. Cl. ........................ 144/144.5 R; 33/197; 33/562; 182/181; 182/224; 144/144.5 GT; 144/371; 144/372
[58] Field of Search ............... 33/197, 562; 409/125, 409/130; 269/296; 182/181, 226, 224; 144/133 R, 134 R, 144 R, 144.5 R, 144.5 GT, 371, 372, 136 R, 134 D, 136 C

[56] References Cited

U.S. PATENT DOCUMENTS 3,732,906  5/1973  Welgas .................................. 144/133 R
3,760,903  9/1973  Thompson ............................... 182/181
3,853,161  10/1974 Welgas .................................. 144/144.5

*Primary Examiner*—W. Donald Bray

[57] ABSTRACT

A mortise template assembly including a first angularly inclined work holding surface and a second work holding surface disposed by an acute angle to the first surface and containing a template centered upon the bisecting line of the acute angle. The first and second surface alternately position a length of wood in precise angular relationship to a cutting blade to permit the blade to make angular cuts. The template contains a predetermined cutting course that is transposed as the assembly is alternately positioned from the first work holding surface to the second work holding surface.

12 Claims, 3 Drawing Sheets

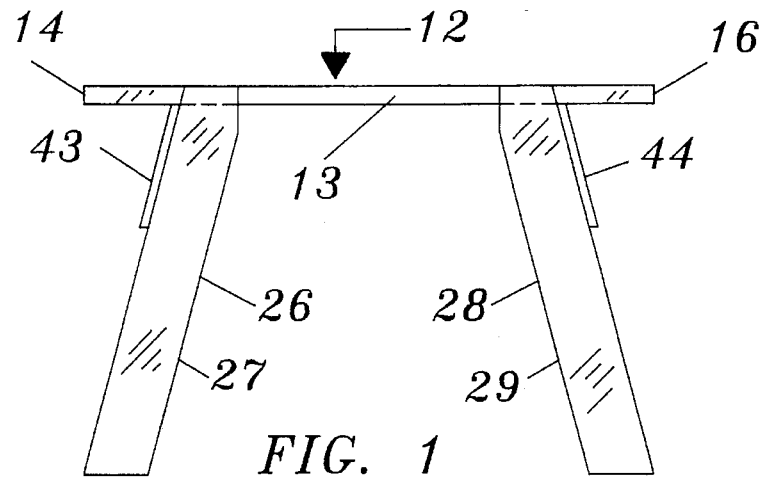
FIG. 1
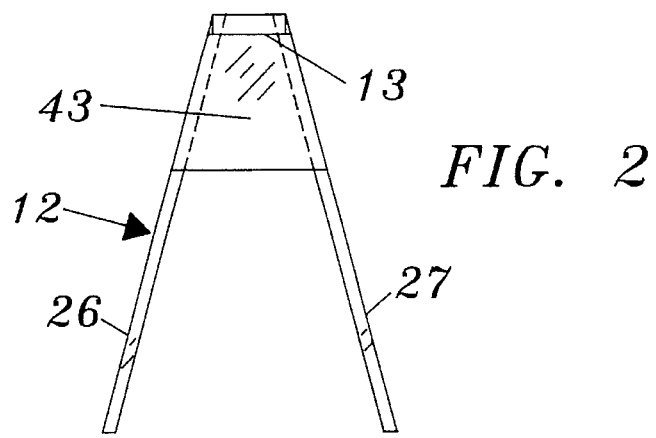
FIG. 2
FIG. 3
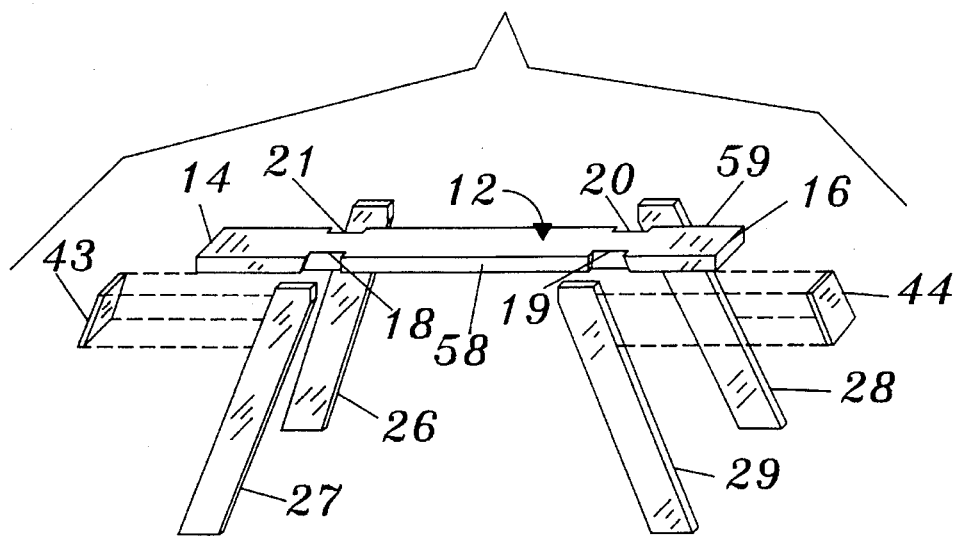

TRANSPOSING INCLINED MORTISE TEMPLATE ASSEMBLY

BACKGROUND OF THE INVENTION

The present invention relates to the art of carpentry tools. More particularly, it is directed to a novel, template assembly for facilitating cutting a first angularly inclined mortise and a second angularly inclined mortise with its orientation transposed to the first mortise, into one side of a length of wood to provide a wedge-lock fit for receiving subassemblies which angularly depend from the length of wood. Means is further provided for marking the subassemblies for sawing.

The construction of a good carpenter's trestle is usually a manual undertaking for novice carpenters and even some experienced ones. Unless the angles and depths of the angularly inclined mortises on the bench beam are correct, the resulting carpenter's trestle can be unstable and defective. Several devices have been designed to increase the accuracy and otherwise simplify cutting of such angularly inclined mortises. For example, U.S. Pat. No. 3,529,361 to Parsons discloses a template to simplify marking such angularly inclined mortises onto a bench beam. U.S. Pat. No. 3,853,161 to Welgas discloses a saw template that supports a router for cutting an angularly inclined mortise within a rectangular perimeter. However, to properly prepare such a mortise for use, the user must then modify one side of the angularly inclined mortise perimeter by using a saw and chisel in the usual manner to create the desired trapezoidal shape. The novel template assembly of the present invention provides means for enabling the operator to precisely cut an angularly inclined mortise within a trapezoidal shaped perimeter, with a minimum of effort. The present invention also provides means to precisely mark angles onto work pieces for sawing to fabricate leg subassemblies compatible with the angularly inclined mortises of the prepared bench beam with a minimum of computation. Further, the present invention provides means to precisely mark angles onto work pieces for sawing to fabricate gusset subassemblies which are compatible with the angularly inclined leg subassemblies and the bench beam, with a minimum of computation.

SUMMARY OF THE INVENTION

The present invention is directed to an inclined, template assembly suitable for use with power tools to quickly and accurately prepare the bench beam, legs and gussets of a carpenter's trestle for fabrication. The work holding surfaces of the template assembly cooperate to alternately position a length of wood in precise angular relationship to a cutting tool such as a power router. The cutting tool cooperates with the template assembly to alternately cut one angularly inclined mortise with a trapezoidal perimeter and another angularly inclined mortise with a transposed trapezoidal perimeter into a length of wood for the receipt of a plurality of legs. The legs angularly depend from the length of wood to form a sturdy carpenter's trestle.

It is the object of the present invention to provide a novel template assembly including a first and second work holding surface which can alternately position a length of wood with respect to a cutting surface. It is another object of the present invention to provide a novel jig and template having included a first and second work holding surface adapted to alternately position a length of wood on a job site to alternately cut precise angularly inclined mortises, in a length of wood using a power tool such as a router. It is another object of the present invention to provide a novel template assembly including guides for marking a plurality of work pieces for sawing, to fabricate leg and gusset subassemblies that cooperate with the bench beam to make a sturdy carpenter's trestle. It is another object of the present invention to provide a novel angularly inclined mortise template assembly that is inexpensive to manufacture. Other objects will be in part obvious and in part pointed out in more detail hereinafter.

BRIEF DESCRIPTION OF THE DRAWINGS

FIG. 1 is a side elevational view of a carpenter's trestle fabricated by utilizing the inclined mortise jig and template in accordance with the present invention.

FIG. 2 is an end elevational view of the carpenter's trestle shown in FIG. 1.

FIG. 3 is an exploded perspective view of a carpenter's trestle fabricated in accordance with the present invention.

DESCRIPTION OF THE PREFERRED EMBODIMENT OF THE INVENTION

Figure 4:
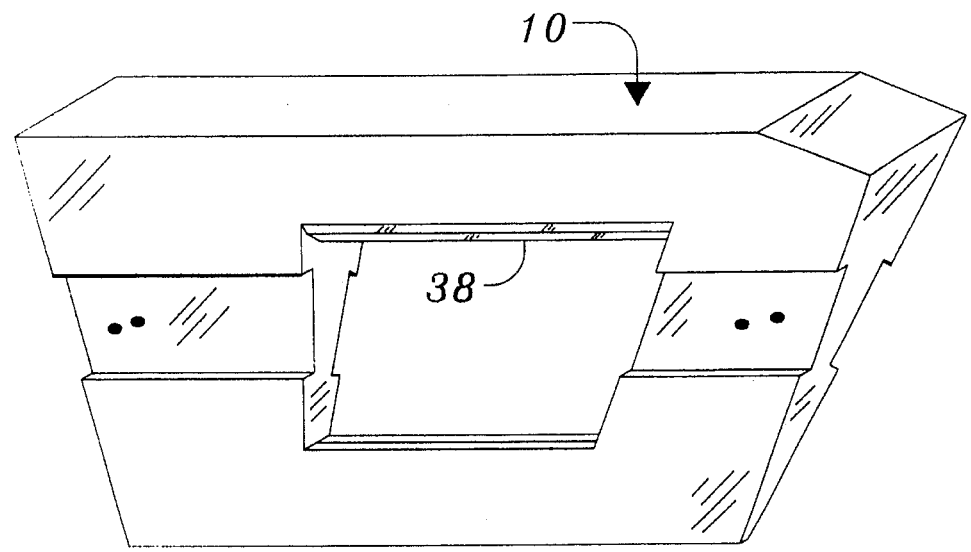
FIG. 4 is a perspective view of one embodiment of the novel template assembly.

Referring now to the drawings FIGS. 1, 2 and 3, I show a carpenter's trestle 12, built in accordance with the present invention. The bench beam 13, which is generally fabricated of 2×4 lumber, is mortised near each transverse end 14 and 16 to provide a plurality of angularly inclined leg receiving recesses 18, 19, and 20, 21 that act to wedge-lock the legs into the bench beam. It is desirable to transversely angularly incline the respective pairs of legs 26, 27 and 28, 29 outwardly for stability purposes. Gussets 43 and 44, generally fabricated of plywood lumber, are attached to the leg sets for added stability.

Figure 5:
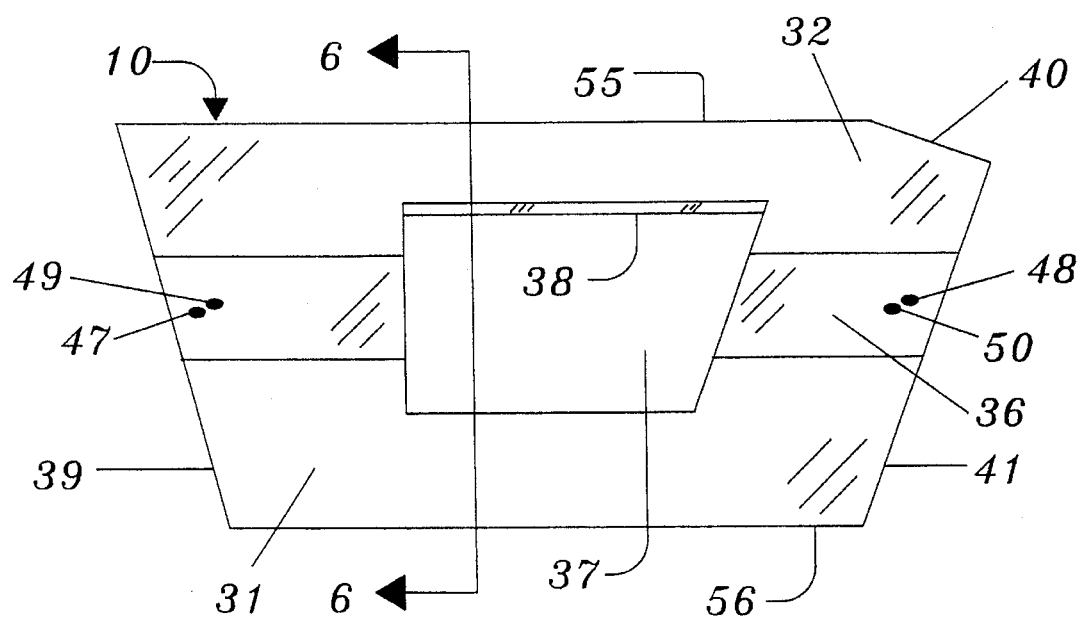
FIG. 5 is a plan view of the novel template assembly shown in FIG. 4.
Figure 6:
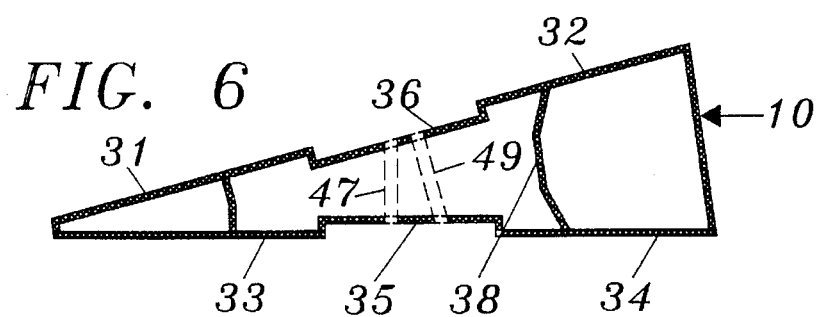
FIG. 6 is a cross sectional view taken along line 6—6 of FIG. 5.

Referring now to FIGS. 4, 5 and 6, I show the novel template assembly 10, comprising an elongated base machined or otherwise formed to provide two pairs of inclined power tool supports 31, 32, and 33, 34. An angularly inclined work holding surface 35 which angularly depends from the plane drawn through the power tool supports 31, 32 and another angularly inclined work holding surface 36, which angularly depends from the plane drawn through power tool supports 33, 34 are machined or otherwise formed, recessed within the power tool supports respectively. A trapezoidal aperture 37 is machined or otherwise formed through the elongated base as a template which defines the mortise area and mortise perimeter for cutting. A protruding stop guard 38 is provided on one side within the aperture 37 for contacting the router guide 53 and preventing the cutting blade 54 from destroying the power tool support surfaces 32 or 34.

Figure 9:
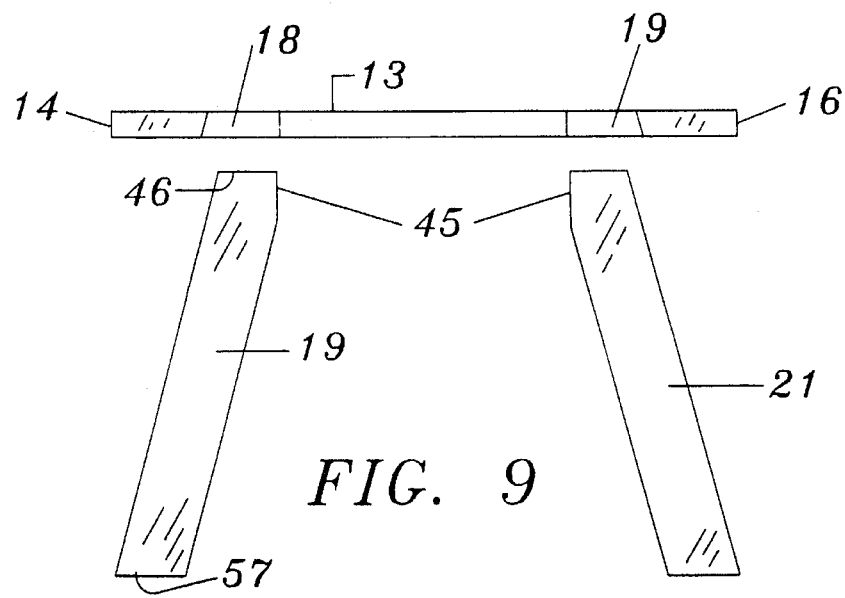
FIG. 9 is a side elevational view showing the bench beam and leg subassemblies properly cut and ready for assembly.

As can be seen in FIG. 5, the transverse surface 39 of the template assembly is disposed by the desired angle from longitudinal sides 55 and 56 to provide means for marking suitable stock material for cutting end gussets 43 and 44 (as seen in FIGS. 2 and 3). Transverse end 41 and adjoining side 40 in combination with sides 55 and 56, cooperate to provide means for marking top leg cut-off 45 and 48 (as seen in FIG. 9). Transverse end 41 in combination with sides 55 or 56 also provides means for marking the leg bottom 57 for cutting. The novel jig and template is made preferably of cast-aluminum, steel or plastic.

Figure 7:
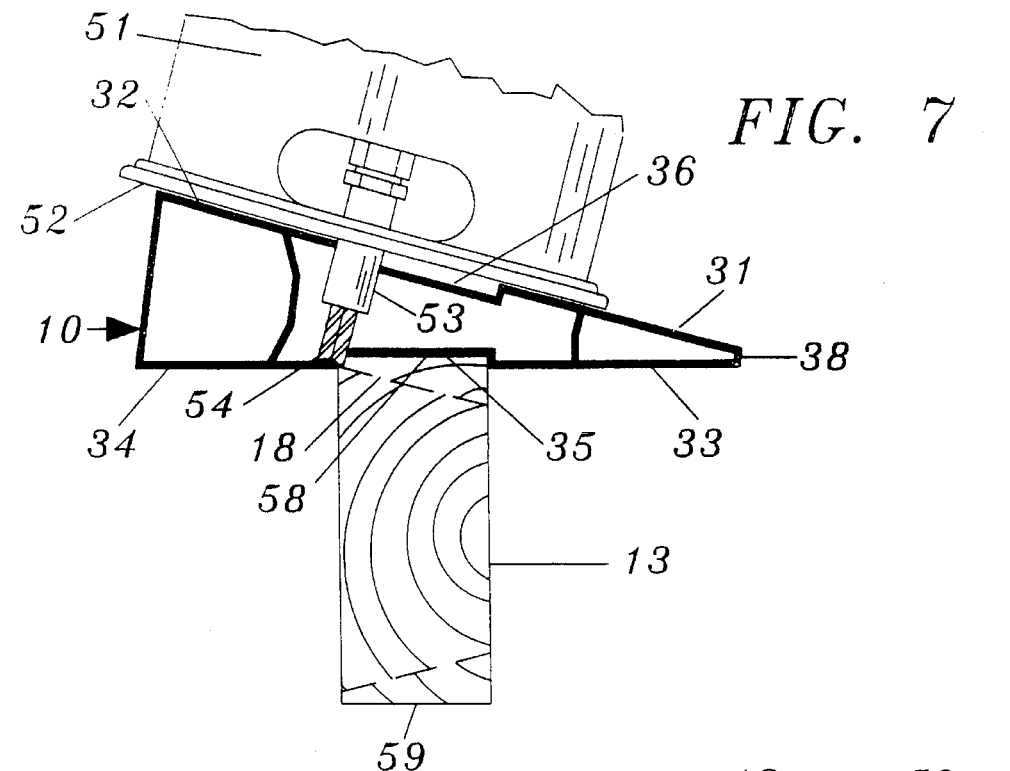
FIG. 7 is an end elevational view showing the novel template assembly of FIG. 4, 5, and 6 in use in connection with a work piece and a power router.
Figure 8:
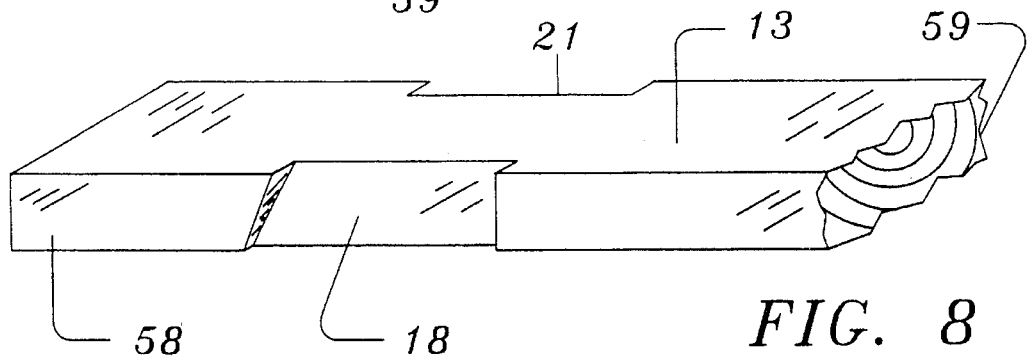
FIG. 8 is a fragmentary, perspective view of one end of a trestle bench beam showing an inclined mortise recess cut by utilizing the novel template assembly in accordance with the present invention.

Referring now to FIG. 7, the novel template assembly 10 is positioned onto side 58 of the bench beam 13 in the desired location to precisely cut angularly inclined mortise 18. The desired distance between inclined mortise 18 and transverse end 14 of the bench beam can be customized to meet individual needs but it is preferred to be typical with respect to the other angularly inclined mortises 19, 20 and 21. Work holding surface 35 is applied to side 58 of the bench beam by driving a nail through each nail guide 47 and 48 to securely position the inclined power tool supports 31 and 32 with respect to the axis of the bench beam. A power router 51 having a work contacting surface 52 and template cutting guide 53 is applied directly onto the novel template assembly 10 in a manner to rest the router base table 52 directly upon the inclined work holding surfaces 31, 32. It will be noticed in FIG. 7 when work holding surface 35 is applied to side 58 of the bench beam 13 only one set of power tool supports 31, 32 is angularly incline with respect to the bench beam. The power router 51 rests directly upon the jig and template 10 and also inclines in the same angular inclination with respect to the bench beam 13. The router blade 54 is then activated in the usual manner to cut the respective angularly inclined mortise 18 to the required depth in a cut that is also parallel with the power tool supports 31, 32. The resulting inclined mortise can best be observed in FIG. 8.

To cut inclined mortise 19 the novel jig and template 10 is positioned over side 58 of the bench beam 13 in the desired location with respect to the axis of the bench beam. Work holding surface 36 is applied to side 58 of the bench beam by driving a nail through each nail guide 49 and 50. The trapezoidal aperture 37 is now transposed and readied for cutting the properly oriented angularly inclined mortise 19. When work holding surface 36 is applied to side 58 of the bench beam 13 only one set of power tool supports 33, 34 angularly incline with respect to the bench beam. The power router rests directly on the power tool supports 33, 34, and activated in the usual manner to cut the respective angularly inclined mortise 19.

To cut the inclined mortise 20 (as seen in FIG. 3), work holding surface 35 is applied to side 59 of the bench beam 13 in the desired location and with respect to the axis of the bench beam in the same manner described for cutting inclined mortise 18.

To cut inclined mortise 21 (as seen in FIG. 3), the novel template is turned over to its opposite side and work holding surface 36 is applied to side 59 of the bench beam in the same manner described for cutting inclined mortise 19.

As illustrated in FIGS. 5 and 9 the novel template assembly 10 provides means to aid marking trestle leg subassemblies for sawing. Those skilled in the art will see when the novel template assembly 10 is positioned on suitable lumber stock with longitudinal side 55 or 56, parallel with the length-wise edge of said lumber, transverse end 41 can aid marking horizontal leg cuts 46 or 57 by simply manipulating the novel jig and template to the desired orientation. Further, plumb cut 45, as seen in FIG. 9, can easily be marked by simply positioning the novel template assembly 10 to the desired position on the suitable lumber stock, keeping longitudinal sides 55 and 56 parallel with the length-wise edge of said lumber and using side 40 as a marking guide.

Referring again to FIGS. 2 and 5 it can be noticed that the vertical and horizontal angled sides of end brace 43 and 44 are identical to the created angle of transverse end 39 and longitudinal sides 55 and 56 of the template assembly 10. By simply positioning the novel template 10 on suitable lumber stock with longitudinal side 55 or 56, parallel with the lengthwise edge of said lumber, the angles of the end braces can easily be marked onto the lumber stock by simply scribing along transverse end 39.

Thus it may be seen that the improved angularly inclined mortise template assembly constructed in accordance with the present invention provides means whereby a series of aids are provided throughout the construction of a carpenters trestle. Moreover, the user may customize dimensions to create smaller or larger carpenters trestle as desired.

Many changes could be made in the above construction and many widely different embodiments of this invention could be made without departing from the scope thereof. It is conceivable that the base could be manufactured as adjustable or built with many various combination of angles making it suitable for the user to manufacture many different leg supported structures. It is therefore intended that all matter contained in the above description shall be interpreted as illustrative and not in a limiting sense.

I claim:

1. In a template assembly for facilitating cutting a first, angularly, inclined recess and a second, transposed, angularly, inclined recess into a work-piece having a plurality of sides and suitable for use with a power tool with a work contacting surface, the combination of:

A. a first pair of spaced inclined power tool supports,
  1. said first supports defining a first plane and providing a support surface to receive the work contacting surface of the power tool;

B. a second pair of spaced inclined power tool supports,
  1. said second supports being attached to said first supports and defining a second plane disposed at an acute angle to said first pair of spaced power tool supports and providing a second support surface to receive the work contacting surface of the power tool;
  2. a template for locating the engagement of the power tool cutting blade, having a trapezoidal interior perimeter and defining a plane, positioned upon the bisecting plane of the created angle between the first and second pairs of power tool supports;

C. a first work holding surface,
  1. said first work holding surface defining a plane, recessed within and parallel to said first pair of power tool supports;

D. a second work holding surface,
  1. said second work holding surface defining a plane, recessed within and parallel to said second pair of power tool supports.

2. The invention of claim 1 wherein means is provided for marking trestle gusset and leg subassemblies for cutting, said means comprising:

A. a first transverse, exterior perimeter end, having one segmented side, disposed by the desired angle to the longitudinal length of the template assembly;

1. said disposed angle of the transverse side, in combination with the longitudinal length of the template assembly, being the marking guide for gusset subassemblies;

B. a second transverse exterior end, having a first and second segmented sides, the first transverse side disposed by the desired angle (of lateral inclination of the legs) to the first longitudinal length of the template assembly;
 1. said disposed angle of the said first side, in combination with the first longitudinal length of the template assembly, being the marking guide for the horizontal leg cuts;
 2. the second segmented side, disposed by a right angle to the first segmented transverse side and intersecting the second longitudinal length of the template assembly;
 3. said disposed angle of the second segmented side in combination with the second longitudinal length of the template assembly being the marking guide for the vertical leg cuts.

3. The invention of claim 1 wherein the first pair of said spaced inclined power tool supports and said second pair of spaced inclined power tool supports are provided in spaced relationship, said supports defining an interior area within which material is removed from the work piece.

4. The invention of claim 1 wherein said first recessed work holding surface having spaced apart parallel sides, said sides contacting the work piece sides to position said template in correct lateral alignment with the longitudinal centerline of the work piece and said second work holding surface having spaced apart parallel sides, said sides contacting the work piece sides to position said template in correct lateral alignment with the longitudinal centerline of the work piece.

5. The invention of claim 1 wherein the work holding surfaces includes means to secure the assembly to the work piece.

6. The invention of claim 1 including means to secure the template assembly comprising of four openings through the work holding surfaces to receive a fastener.

7. In a template assembly for facilitating cutting a first, angularly, inclined recess and a second, transposed, angularly, inclined recess into a work-piece having a plurality of sides and suitable for use with a power tool with a work contacting surface, the combination of:

A. a first pair of spaced inclined power tool supports,
 1. said first supports defining a first plane and providing a support surface to receive the work contacting surface of the power tool;

B. a second pair of spaced inclined power tool supports,
 1. said second supports being attached to said first supports and defining a second plane disposed at an acute angle to said first pair of spaced power tool supports and providing a second support surface to receive the work contacting surface of the power tool;

C. a first recessed work holding surface,
 1. said first recessed work holding surface inclined, resting upon the work piece to position the said second power tool supports in angular relation to said work piece;
 2. said first recessed work holding surface, having spaced apart parallel side walls, said side walls contacting the work piece sides to position said work piece in correct lateral alignment with the longitudinal centerline of the aperture;

D. a second recessed work holding surface,
 1. said second recessed work holding surface inclined, resting upon the work piece to position the said first power tool supports in angular relation to said work piece;
 2. said second recessed work holding surface, having spaced apart parallel side walls, said side walls contacting the work piece sides to position said work piece in correct lateral alignment with the longitudinal centerline of the aperture;

E. an aperture for locating the engagement of the power tool cutting blade;
 1. said aperture defined by two spaced apart parallel sides, either side spaced outwardly a preselected distance from the longitudinal center line of said assembly and two spaced apart unparallel sides, either side spaced outwardly a preselected distance from the transverse centerline of said assembly.

8. The invention of claim 7 wherein means is provided for marking trestle gusset and leg subassemblies for cutting, said means comprising:

A. a first transverse, exterior perimeter end, having one segmented side, disposed by the desired angle to the longitudinal length of the template assembly;
 1. said disposed angle of the transverse side, in combination with the longitudinal length of the template assembly, being the marking guide for gusset subassemblies;

B. a second transverse exterior end, having a first and second segmented sides, the first transverse side disposed by the desired angle (of lateral inclination of the legs) to the first longitudinal length of the template assembly;
 1. said disposed angle of the said first side, in combination with the first longitudinal length of the template assembly, being the marking guide for the horizontal leg cuts;
 2. the second segmented side, disposed by a fight angle to the first segmented transverse side and intersecting the second longitudinal length of the template assembly;
 3. said disposed angle of the second segmented side in combination with the second longitudinal length of the template assembly being the marking guide for the vertical leg cuts.

9. The invention of claim 7 wherein the work holding surfaces includes means to secure the assembly to the work piece.

10. The invention of claim 7 including means to secure the template assembly comprising four openings through the work holding surfaces to receive a fastener.

11. The invention of claim 7 wherein the aperture includes means to limit movement of the power tool to prevent the cutting blade from destroying the inclined power tool supports.

12. The invention in claim 11 wherein said means for limiting movement of the power tool comprises a stop mounted on the longer parallel side within the aperture and centrality positioned upon the bisecting plane of the created angle between the first and second pairs of power tool supports.

* * * * *